March 22, 1966     L. SCHAFER     3,241,503
CONCENTRIC PASTRY DIE
Filed Aug. 21, 1963

United States Patent Office 3,241,503
Patented Mar. 22, 1966

3,241,503
CONCENTRIC PASTRY DIE
Leonhard Schafer, 219 Miriam St., Bronx, N.Y.
Filed Aug. 21, 1963, Ser. No. 303,513
1 Claim. (Cl. 107—1)

This invention relates to an article of manufacture or die used in the manufacture of butter cookies having a plurality of concentric layers of varying colors.

The prior art process conventionally used to make cookies having concentric layers of pastry is to roll by hand the separate layers of pastry about a core piece.

Such a procedure is very expensive as it requires much time of skilled labor.

It is an object of this invention to provide a die or mold wherein a substantially endless rod of pastry of many colors may be extruded according to a preselected die pattern.

The extruded pattern is then cut into long rods of suitable length and stored under refrigerated conditions. When there is need for cookies of said pattern the rods are cut into suitably thick discs and baked to produce substantially unlimited amounts of freshly baked cookies of said pattern or design.

Figure 1:
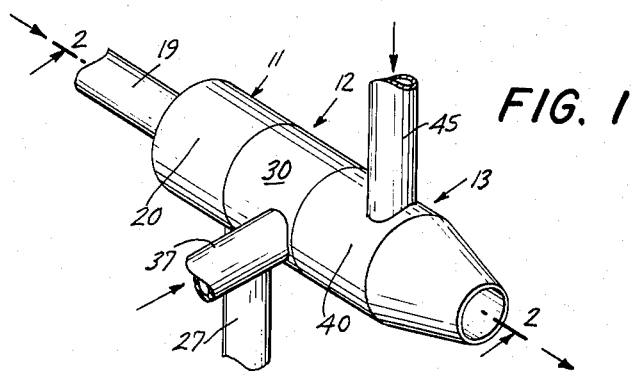
Figure 2:
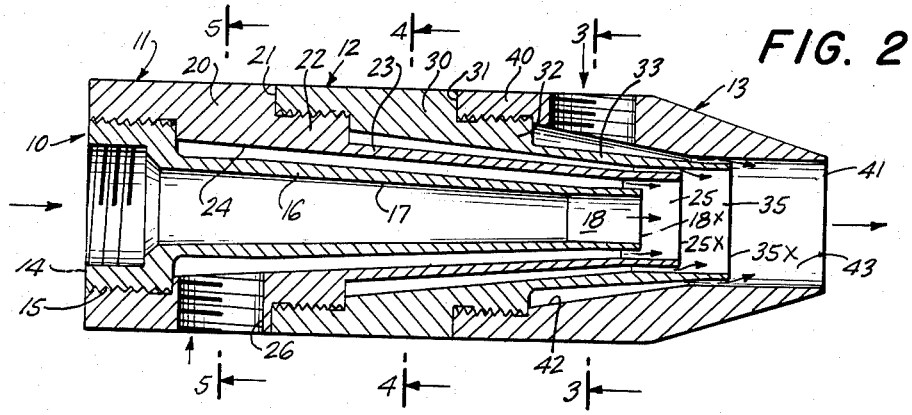
Figure 5:
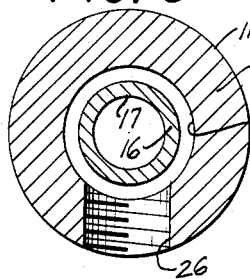
Figure 4:
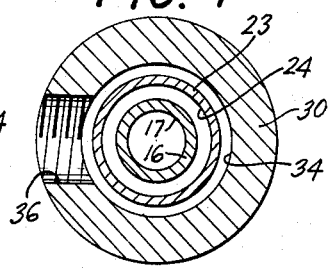
Figure 3:
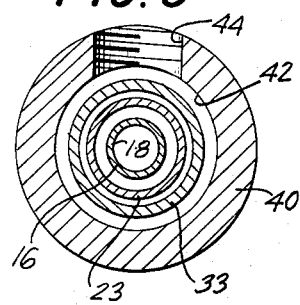
Figure 6:
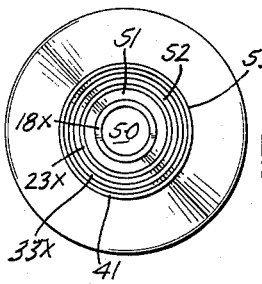
Figure 7:
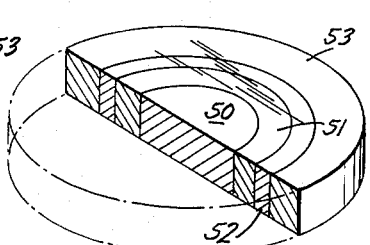

These and other objects of this invention will become readily apparent upon reading the following descriptive disclosure taken in conjunction with the accompanying drawing in which:

FIG. 1 is a perspective view of the die showing by means of arrows the flow of pastry into and out of said die, FIG. 2 is a longitudinal section taken on line 2—2 of FIG. 1, also showing by means of arrows the four streams of pastry flowing into and through said die, FIG. 3 is a transverse section taken on line 3—3 of FIG. 2, FIG. 4 is a transverse section taken on line 4—4 of FIG. 2, FIG. 5 is a transverse section taken on line 5—5 of FIG. 2, FIG. 6 is a front view of the die, and FIG. 7 is a fragmentary perspective view, partly in section, of the concentric pastry extruded from said die.

According to this invention the die is made of four tubular pieces of stainless steel of rigid construction so as to withstand the heavy pressures used to extrude the pastry of a thick consistency.

The four substantially tubular pieces constituting the die are an inner conical nozzle core piece 10, an overlapping first conical nozzle piece 11, an overlapping second conical nozzle piece 12 and a front conical piece 13.

As shown in FIG. 2, the inner tubular core piece 10 is provided with a cylindrical base 14 having exteriorly disposed screw threads 15 thereon, said cylindrical base being provided with a suitably long integral conical nozzle 16. The inner wall 17 of nozzle 16, as shown, tapers toward the axis to meet an integral cylindrical inner horizontally disposed wall 18 of said nozzle 16.

Pastry 50 of a specific color and/or flavor is forced through conduit 19 into the nozzle 16 and is extruded as a solid rod from horizontal inner wall 18 thereof as a cylindrical rod 50 (FIG. 7). As shown in FIG. 2, the rear interior wall of core piece 10 is interiorly threaded to engage a conventional conduit (not shown) supplying the pastry 50 to said piece 10.

The first overlapping conical nozzle piece 11 is provided with a cylindrical base 20 having a smooth exterior and having an interiorly disposed threads to engage screw threads 15 of said core piece 10. The base 20 is also provided with a suitable circular shoulder 21. A cylindrical exteriorly threaded set-back portion 22 is integral with said base 20 and with nozzle 23.

Nozzle 23 of element 11 is rigidly disposed in suitable spaced relationship to nozzle 16 of core piece 10 to permit the flow of an annular stream of pastry 51 therebetween (FIG. 7). The inner wall of nozzle 23 is provided with a conical surface 24 terminating at its front end integrally with a cylindrical horizontally disposed wall 25.

As shown in FIG. 2, the horizontal nozzle wall 18 of core piece 11 extends a suitable distance into the horizontal nozzle wall 25 of the conical nozzle 23 of overlapping element 11. Said element is provided with a threaded inlet aperture 26 for engaging a co-acting conduit 27 having pastry 51 under pressure. The pastry 51 is introduced about the exterior surface of the rear end of nozzle 16 and is pushed around said nozzle 16 and along wall 24 of nozzle 23 to form the first or innermost annular layer 51 of the cookie (FIG. 7).

The second overlapping conical nozzle 12 is of similar construction to nozzle 11 being provided with a base portion 30 suitably interiorly threaded to engage the threads of set-back portion 22, a circular shoulder 31, an exteriorly threaded set-back portion 32 integral with base 30, a nozzle 33 integral with said set-back portion 32, said nozzle 33 having a sloping inner wall 34 integral with a front horizontally disposed cylindrical wall 35. The element 12 is provided with a threaded inlet aperture 36 for pastry 52 (FIG. 7), which is conducted into said aperture 36 through conduit 37.

As shown in FIG. 2, the pastry 52 is forced in at the rear of nozzle 23 through aperture 36 engaging and surrounding the exterior wall thereof issuing out of the front end of nozzle 33 while engaging the horizontal wall 35 thereof.

The outermost or front piece 13 is provided with a cylindrical base 40 having interior screw threads to engage the exterior threads of the set-back portion 32 of element 12. The front end of element 13 is preferably provided with a taper to lead to the tubular orifice 41 thereof. The inner tubular wall of element 13 is provided with a rear sloped portion 42 which is integral with a front horizontally disposed portion 43.

The front element 13 is also provided with a threaded inlet aperture 44 to which a threaded conduit 45 is secured for introduction of the fourth stream 53 of suitable pastry to form the third annular ring 53 of the cookie (FIG. 7).

In the operation of the extrusion die of this invention provision is made to feed the specific pastry of desirable consistency into the respective conduits with suitable force to form well defined annular rings in the composite rod of pastry issuing from the orifice 41.

It is of great importance according to this invention to have the pastry issue in parallel relationship as it engages each successive stream.

Thus the pastry core stream 50 issues from nozzle 16 as a horizontal stream to engage the first annular pastry stream 51 also disposed in a horizontal and parallel relationship.

In short, the smooth walled portions 18, 25, 35 and 43 are disposed in a parallel suitably spaced-apart telescopic relationship. This is important in order to produce the desired result.

If the front orifice or opening of nozzles 16, 23 and 33 were to terminate in planar relationship to orifice 41 the results would be undesirable. Thus as shown in FIGS. 2 and 6, nozzle 16 terminates in orifice 18X, and nozzle 23 terminates in orifice 25X and nozzle 33 terminates in orifice 35X. It therefore is critical that orifice 18X be located suitably within cylindrical wall 25 of nozzle 23, and that orifice 25X be located suitably within cylindrical wall 35 and that orifice 35X be located suitably within cylindrical wall 43 in order that the respective pastry layers be commingled into an inseparable bond. Otherwise faulty adhesion may result.

Where the respective orifices 18X, 25X and 35X are disposed within the inner one-third to one-half portion of the respective preceding cylindrical portion of the respective adjacent nozzle excellent commingling of the respective extruded pastry streams is obtained.

A critical feature of this invention is therefore the diminishing or inward telescopic disposition of the orifice of the respective nozzles with the innermost nozzle 16 having the innermost orifice 18X with respect to orifice 41. Thus the blending of the pastry streams is effected by parallel streams pressing into one another over a suitable distance.

This invention has been described by means of an illustrative example but it is not to be limited to this illustration for it is of a broader scope. Clearly, if a five layer cookie is desired the addition of another element such as element 12 would effectuate this result.

I claim:

A tubular die for intimate forming and commingling of concentric layers of pastry dough to a core layer comprising an inner unitary tubular element having a base and a conical nozzle having an inner conical surface integral with an inner cylindrical surface at its front end; an intermediate unitary tubular round element having a base portion and a conical nozzle having an inner conical surface integral with a cylindrical surface at its front end, said intermediate element having an inlet aperture in its base portion, said base being adapted to engage said inner element with the respective nozzles being in spaced-apart relationship to receive pastry dough from said aperture, said cylindrical surface of said intermediate element being suitably disposed over the cylindrical surface of said inner element; an additional nozzle element threaded on and substantially identical with said intermediate element and disposed in suitable overlapping relationship therewith, and a front exterior unitary tubular element having a base having an inlet aperture and an inner conical wall surface integral with a cylindrical surface at its front end, said cylindrical surface portion of said front element being in suitable spaced-apart and over-lapping relationship over the cylindrical surface portion of said additional element, whereby pastry dough of suitable consistency entering said inner element and inlet apertures is formed into layers concentric with a core layer and issues in bonded linear parallel relationship from said die.

References Cited by the Examiner

UNITED STATES PATENTS

| | | | |
|---|---|---|---|
| 279,133 | 6/1883 | Chase | 107—1 |
| 484,777 | 10/1892 | Chase | 25—8 |
| 1,566,705 | 12/1925 | Tanzi | 107—54 |
| 2,042,940 | 6/1936 | Herron | 107—1 |
| 2,532,131 | 11/1950 | Van Voorst | 107—1 |
| 2,689,537 | 9/1954 | Peyton | 107—54 |

WALTER A. SCHEEL, *Primary Examiner.*

IRVING BUNEVICH, *Examiner.*

JOSEPH SHEA, *Assistant Examiner.*